United States Patent [19]

Pratt et al.

[11] 4,071,643

[45] Jan. 31, 1978

[54] METHOD OF MANUFACTURING BEARING MATERIAL

[75] Inventors: George Christopher Pratt, Chorleywood; Barry John Eastwood, High Wycombe; Anthony Dennis Michael; Leonard Heath, both of London, all of England

[73] Assignee: The Glacier Metal Company Limited, Wembly, England

[21] Appl. No.: 633,695

[22] Filed: Nov. 20, 1975

Related U.S. Application Data

[62] Division of Ser. No. 435,933, Jan. 23, 1974, abandoned.

[30] Foreign Application Priority Data

Jan. 24, 1973 United Kingdom .................. 3551/73

[51] Int. Cl.² ............................................. C23C 1/06
[52] U.S. Cl. .................................... 427/292; 427/329; 427/433; 427/405; 427/401; 428/653; 428/643; 428/645; 308/237 R; 29/149.5 S
[58] Field of Search ............... 427/289, 290, 292, 329, 427/433, 405, 401; 29/196.2, 197, 191.6, 191, 194; 428/643, 645, 653

[56] References Cited

U.S. PATENT DOCUMENTS

| | | | |
|---|---|---|---|
| 1,984,624 | 12/1934 | Bagley | ................................. 427/292 |
| 2,599,726 | 6/1952 | Schluchter | ...................... 427/292 X |
| 2,615,768 | 10/1952 | Schluchter | ...................... 427/292 X |
| 3,195,991 | 7/1965 | Stern et al. | ............................ 29/197 |
| 3,251,119 | 5/1966 | Kingsbury et al. | ................ 29/196.2 |

*Primary Examiner*—Ralph S. Kendall
*Attorney, Agent, or Firm*—Burns, Doane, Swecker & Mathis

[57] ABSTRACT

This invention is the production of a plain bearing having an aluminum interlayer and a metal overlay on the interlayer. The overlayer is for example cast on the interlayer so that it can constitute substantially the final bearing surface without machining after casting or roll-bonding. In order to enable the overlay to be cast on, the interlayer is abraded while below the surface of a tinning or other coating material in a material so that oxides can be removed from the aluminium surface and the coating applied to it without its becoming re-oxidised, and then the overlay can be applied to the coating.

2 Claims, 1 Drawing Figure

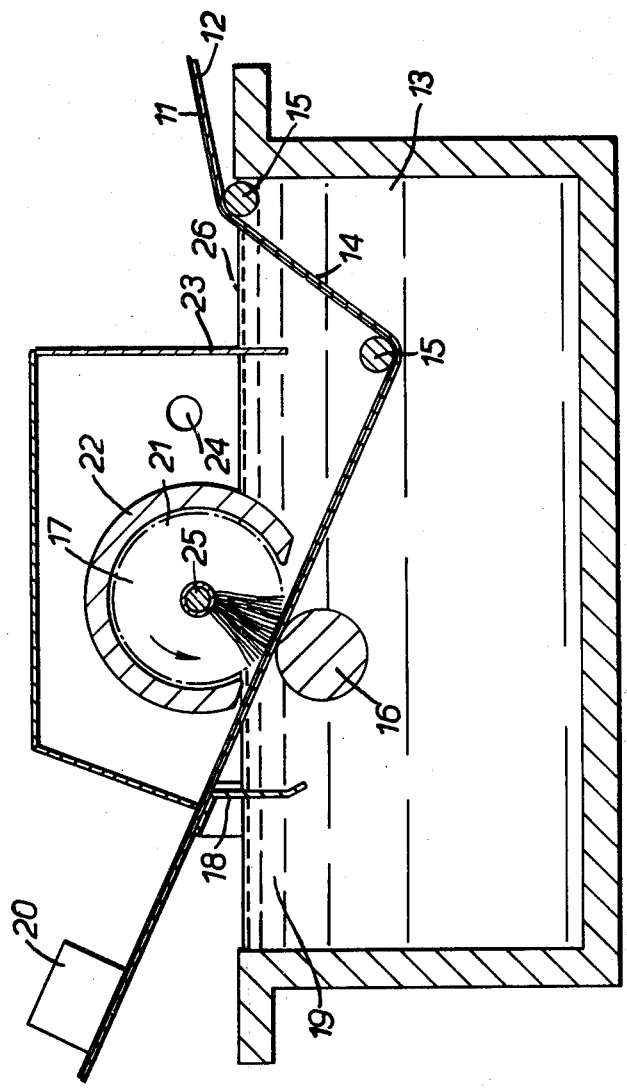

METHOD OF MANUFACTURING BEARING MATERIAL

This is a division of application Ser. No. 435,933 filed Jan. 23, 1974, now abandoned.

This invention relates to multi-layer metallic bearing material of the kind where there is a layer of aluminum of aluminium-based alloy bonded to a steel backing and an overlay is applied to the interlayer, and to a process for providing such material.

It is known to provide a backing with a final bearing surface by plating the backing with a layer of metal, for example lead/tin alloy, referring to herein as an overlay the plating operation being performed when the bearing is in its final shape, which may be that of a semi-cylindrical shell. This method has a disadvantage that each bearing has to be treated as a group or in a stack so that all the bearings may be treated in a uniform way. There is a problem in conveying the shells to the plating apparatus and the stacks of bearing shells have to be held in a jig in the plating solution.

According to the invention a method of manufacturing multi-layer strip material comprising an aluminium or aluminium alloy interlayer bonded to a steel strip includes the step of passing the material through a bath of a molten coating material and removing oxide on the interlayer surface while it is below the surface level of the coating material, whereby the coating material becomes coated on the oxide-free surface.

The removal of the oxide which always forms on aluminium surfaces while the aluminium is below the the surface of the molten material enables the lead/tin coating to adhere satisfactorily to the aluminium and then the overlay can be readily bonded to the coating. Casting of the overlay enables its thickness to be accurately controlled so that after bonding it is ready for forming into a plain bearing without further machining to remove metal.

Previously it was not thought worth developing a method of casting an overlay on aluminium because it was thought that the overlay would have to be machined to size and that involved difficult handling problems. Handling the bearing also tends to damage the bearing surface and, of course, coiling and uncoiling the strip, passing the strip between rollers, and so forth, may tend to damage the surface. The cast overlay must not unduly vary in thickness since otherwise part of it may be machined off when the surface is finished or the variations in thickness may exceed what is allowable.

Any surface finishing treatment when the bearing is in its final formed condition, will depend to some extent how the strip and bearings are handled and how the bearings are formed. Even if the overlay thickness at the crown of the finished bearing has been somewhat affected by the forming process, it is of no great significance because should the underlying aluminium alloy be exposed this will act perfectly well as a bearing surface. This would not be true for bearing materials other than of aluminium alloys.

The surface of the coated aluminium should be substantially flat before the overlap is bonded to it, and the overlay thickness before the bearing is formed should be within plus or minus 0.0004 inch.

If some little machining is required to the surface of the overlay it will be to remove very little material because the surface layer in the strip form is closely controlled as regards thickness and is laid on a substantially flat surface.

According to another aspect of the invention a strip of bearing material has a steel backing, an interlayer of aluminium or aluminium alloy bonded to the backing and an overlay bonded to the interlayer, the outer surface of which overlay is the surface after bonding without removal of metal by subsequent machining.

The invention includes a method of manufacturing a plain bearing in which an overlay is bonded to an interlayer on a backing to form a multi-layer strip which then is formed into a bearing without removing metal in a machining operation.

The invention may be carried into practice in various ways and one embodiment will be described by way of example with reference to the accompanying single FIGURE of the drawing, in which the single FIGURE is a partly diagrammatic side view of a process for applying a bearing overlayer to an aluminium alloy interlayer on a steel backing for use in the manufacture of a plain bearing.

Conveniently the 'aluminium' interlayer is provided by an alloy consisting of 0.8 – 1.5% copper by weight and 10 – 11.5% silicon by weight, the balance being aluminium.

The aluminium interlayer 11 is roll bonded to the steel backing 12 by a conventional method and the exposed surfaces of the steel are covered with a lime wash before the strip is fed into a bath 13 of molten alloy consisting of 10% tin by weight, the remainder being lead. The strip 14 passes between rollers 15 which keep it flat across its width, and then is led upwards between a roller 16 and a brush 17 to receive a thin coating of the lead/tin alloy before leaving the bath over a smooth surface 18 between guides 19 at the upper left-hand edge of the bath, whence it passes directly to a casting apparatus 20 in which a lead/tin overlay is cast on to it by use of a graphite die, the bottom of which is closed by the strip 14 while the coating on the strip is still molten. The method enables the lead/tin overlay to be of a uniform thickness accurate to ± 0.0004 inch. The lime wash is finally washed off. The apparatus 20 may be as described in British Patent Specification No. 435,309.

It is not possible to cast directly onto the aluminium interlayer mainly because of the oxide coating which always forms on it, but it is possible to cast directly onto the lead/tin coating.

That lead/tin coating can be secured to the aluminium because the brush 17 acts to brush off the oxide layer on the aluminium while the strip is actually in the bath 13 and below the surface of the alloy in the bath.

The brush 17 has bristles 21 of a material which is unaffected by the molten metal in the bath for example mild steel or litanium and rotates at a speed of 500 r.p.m. within a shroud 22 which reduces splashing and causes molten metal to be drawn around into the clearance space within the shroud to reduce oxidation by air which may have been drawn into the shroud by entrapment in the bristles or on the strip. Such air is likely to be very little, if any, because the shroud is itself in a housing 23 filled by nitrogen at 24. The brush bearings 25 are kept above the surface 26 of the molten alloy.

The strip 14 is in the bath 13 for a long enough time before it encounters the brush 17 to be raised to the temperature of the molten alloy by the time its surface is brushed free of oxide and it is able to accept its lead/tin coating. The brushed aluminium surface remains in the bath for about one second at the feed speed of 4 inches per second and that time is insufficient for the aluminium to begin to dissolve or to melt.

It is to be noted that the strip leaves the bath quite flat across its width and along its length so that it is quite suitable for closing the casting die during coating of the overlay.

The process enables a strip of bearing material, for forming into plain shell bearings, for example, to be formed in a continuous process, with the cast-on lead/tin overlay usable as the final bearing surface with no, or very slight, machining. Thus the strip can be cut into lengths and formed into semi-cylindrical shells which do not require further machining or plating.

What we claim as our invention and desire to secure by Letters Patent is

1. A method of manufacturing a plain bearing, which comprises bonding an aluminum or aluminum alloy interlayer to a continuous steel backing strip;

passing the resulting composite strip below the surface of a bath of molten lead/tin alloy coating material;

holding the composite strip under the surface of the bath of coating material until its temperature is substantially equal to that of the bath of coating material;

removing oxide from the surface of the interlayer, during its stay in the bath, and coating the resulting cleaned surface with said coating material;

withdrawing the coated composite strip from the bath over means retaining the strip straight across its width; casting a lead/tin alloy overlay onto the coated surface of the interlayer; and forming the coated composite strip material with its overlay into a semi-cylindrical bearing shell without removing metal in a machining operation.

2. A method as claimed in claim 1 in which the oxide is removed by a brush which is moved under the surface of the molten coating material.

* * * * *